Aug. 7, 1951 A. V. HAEFF ET AL 2,562,907

MODULATOR

Filed Feb. 13, 1946 2 Sheets-Sheet 1

Inventors
ANDREW V. HAEFF
FRANKLIN H. HARRIS

By M. C. Hayes

Attorney

Aug. 7, 1951 A. V. HAEFF ET AL 2,562,907
MODULATOR
Filed Feb. 13, 1946 2 Sheets-Sheet 2
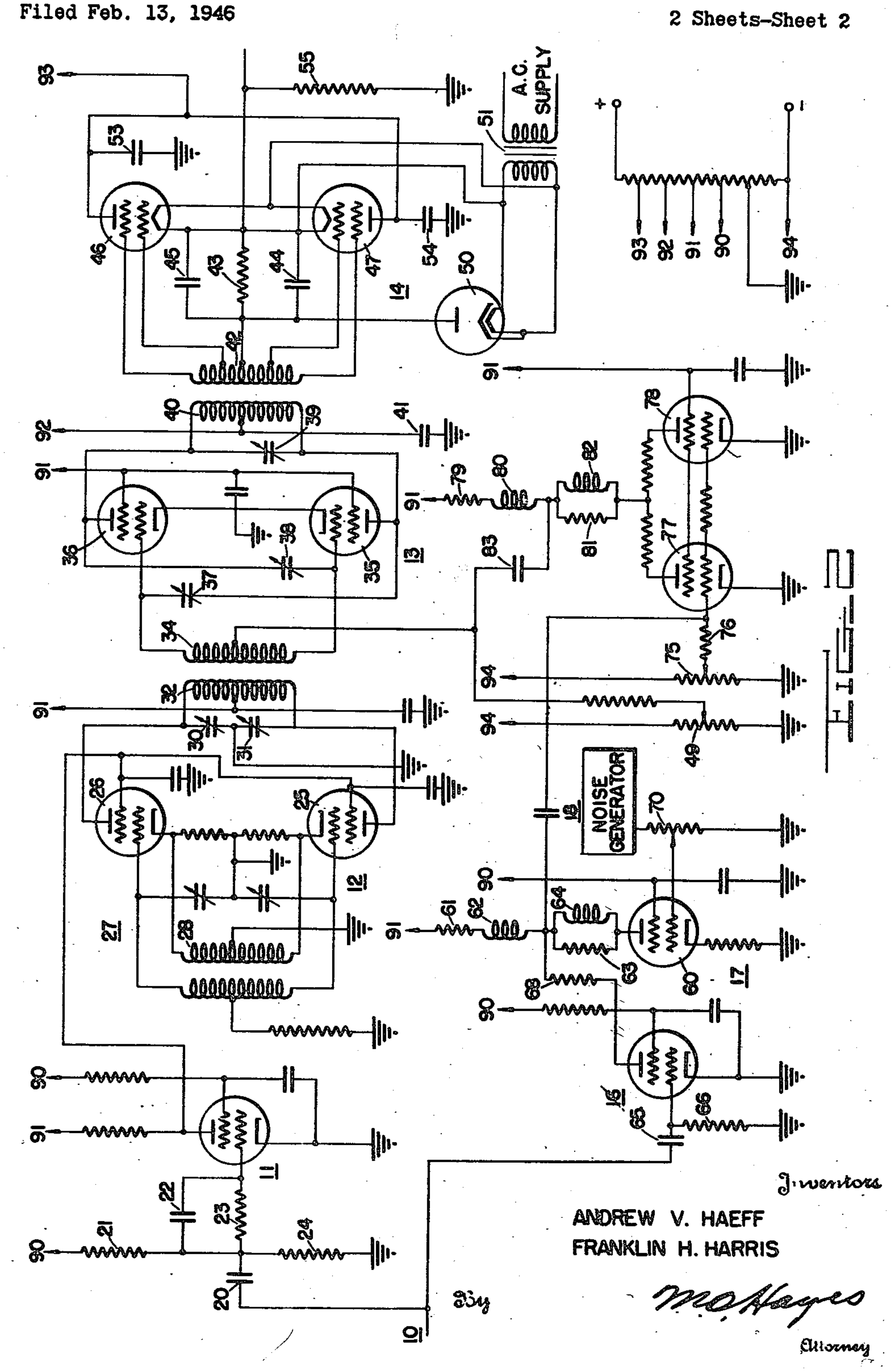
Inventors
ANDREW V. HAEFF
FRANKLIN H. HARRIS
By M. O. Hayes
Attorney Patented Aug. 7, 1951

2,562,907

UNITED STATES PATENT OFFICE 2,562,907

MODULATOR

Andrew V. Haeff, Washington, D. C., and Franklin H. Harris, Accokeek, Md.

Application February 13, 1946, Serial No. 647,414

14 Claims. (Cl. 332—9)

(Granted under the act of March 3, 1883, as amended April 30, 1928; 370 O. G. 757)

This invention relates to apparatus for generating high voltage electrical impulses.

In many applications, including those related to radar operations and to counter measures undertaken against radar operations, it is necessary to generate high voltage electrical impulses which are timed accurately to coincide with a control signal. In conventional circuit design, electrical impulses are generated by abruptly initiating or terminating the flow of current in a resistor with a switch tube. Positive impulses are obtained by terminating the flow of current in a plate resistor or initiating a flow of current in a cathode resistor. If the plate resistor is used, the switch tube must be conducting between impulses; and if high voltage impulses from a low output impedance source are required, the power loss in the switch tube circuit will frequently be more than can be tolerated. On the other hand, if the cathode resistor is used, no voltage amplification is possible unless the circuits applying the control or timing signal are operated about the potential of the cathode terminal of the switch tube. The latter method, known at bootstrapping, often involves design difficulties in that, if additional capacity is introduced between the cathode of the switch tube and ground, the slope of the leading edge of the high voltage impulse is reduced.

This invention provides a method of generating high voltage impulses in which pulses of oscillations at a carrier frequency are generated, amplified, and rectified. The particular embodiment of the invention to be disclosed is for use with an interference transmitter the pulsed output of which is modulated with a signal comprising a spectrum of random frequencies commonly called a noise signal. The invention includes the means for modulating the high voltage impulses.

An object of this invention is to provide a means for generating high voltage electrical impulses.

Another object of this invention is to generate pulses of the character described in the first object responsively to and coincident with control signal pulses.

Another object of this invention is to provide a method of and a means for modulating impulses of the character described in the first object with a noise signal.

Other objects and features of this invention will become apparent from a consideration of the following detailed description and the accompanying drawings in which:

Fig. 2 is a schematic diagram of this embodiment of the invention.

Figure 1:
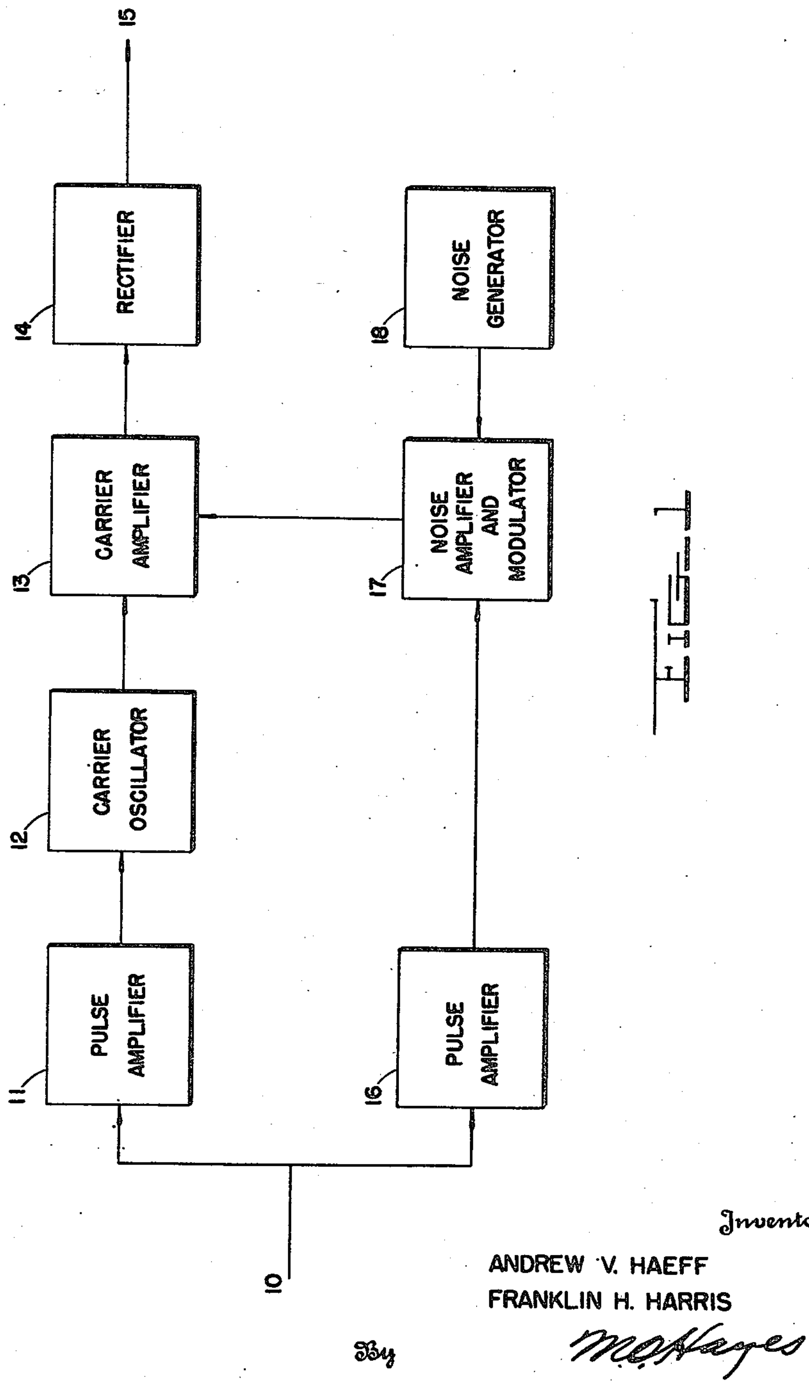
Fig. 1 is a block diagram of a specific embodiment of the invention.

In accordance with Fig. 1, the control pulses of negative polarity are applied at input terminal 10 to two pulse amplifiers, 11 and 16.

Carrier oscillator 12 is continuously operative at a high frequency; however, in the normal condition the fixed bias on the oscillator tubes is such that the output is very small. Amplified positive pulse signals are applied from pulse amplifier 11 to the carrier oscillator, raising the bias of the oscillator tubes to effect oscillation at peak amplitude. The circumstance that carrier oscillator 12 is kept operative between pulses makes possible a very rapid response to the control signals. If it were necessary that oscillations be initiated with each pulse, the time required to build up oscillations to peak amplitude would be greater than could be tolerated.

The output of carrier oscillator 12 is coupled to carrier amplifier 13. The tubes of carrier amplifier 13 are normally biased below cut off, but are rendered conducting when carrier oscillator 12 is pulsed. The output of the carrier amplifier 13 is inductively coupled to the rectifier stage 14 in which the pulses of carrier frequency oscillations are demodulated for application to a transmitter. Plate detection is used, and the output 15 is taken from the cathodes of the rectifier tubes. Inductive coupling makes possible applying the signal from the carrier amplifier between the grids and cathodes of the rectifier tubes with a minimum of complications.

In this embodiment of the invention, the output pulses are modulated with a noise signal. The noise signal is generated in noise generator 18, amplified in the noise amplifier and modulator 17 from which it is applied to the grids of the carrier amplifier tubes. Noise generator 18 can be of any one of several devices known to the art for generating a signal which comprises the random interplay of a broad spectrum of frequencies. For best amplification of the noise signal, it is necessary that the tubes of noise amplifier and modulator 17 be biased at a level which is undesirable for continuous operation. Consequently the noise amplifier and modulator 17 receives enabling bias in pulses from pulse amplifier 16.

For a more detailed description of the circuits used in this embodiment of the invention, reference is made to Fig. 2.

Negative control pulses are applied from terminal 10 to pulse amplifier tube 11 through the frequency compensated input circuit comprising resistors 23 and 24 and capacitors 20 and 22. The quiescent bias on pulse amplifier tube 11 is held positive by the voltage divider action of resistors 21 and 24 in order that the tube will draw sufficient plate current to hold its plate voltage at a low value.

The carrier oscillator 12 consists of a push pull oscillator circuit in which a tuned circuit 27 connecting the grids of the two tubes 25 and 26 determines the frequency of oscillation. Feedback is provided by a coil 28 connecting the cathodes of the two tubes and inductively coupled to the coil of tuned circuit 27. The screen grids of tubes 25 and 26 are connected to the plate of the pulse amplifier tube 11, and, accordingly, in the no signal condition are held at a voltage just sufficient to allow the tubes to oscillate. However, when negative control pulses are applied to the grid of pulse amplifier tube 11, this tube is cut off, and its plate voltage and that of the screen grids of tubes 25 and 26 rise to a voltage at which the carrier oscillator yields a maximum output. The plates of tubes 25 and 26 are connected through a tuned circuit comprising capacitors 30 and 31 and coil 32. The connection between capacitors 30 and 31 is grounded and the center tap of coil 32 is connected to the positive side of a suitable power supply 91 and to ground through capacitor 33.

The output of oscillator 12 is coupled to carrier amplifier 13 by inductive coupling between coils 32 and 34. Tight coupling is used to simplify tuning.

Carrier amplifier 13 consists of tubes 35 and 36 connected in a push pull amplifier circuit. The input signal is applied to the grids of these tubes from the terminals of coil 34. Capacitor 37, connected between the grid of tube 36 and the plate of tube 35, and capacitor 38, connected between the grid of tube 35 and the plate of tube 36, serve as neutralizing condensers to prevent possible self oscillation or regeneration. A negative bias is applied to the grids of the tubes through the center tap of coil 34 from potentiometer 49. This bias is normally adjusted to reduce the carrier frequency output of amplifier 13 to zero between pulses. The plates of tubes 35 and 36 are connected by a tuned circuit consisting of capacitor 39 and coil 40. The center tap of coil 40 is connected to the positive side of a suitable power supply 92 and to ground through capacitor 41.

The output of carrier amplifier 13 is coupled to the rectifier 14 by inductive coupling between coils 40 and 42. Again tight coupling is used to simplify tuning. Rectifier 14 consists of tubes 46 and 47 driven in push pull as plate detectors, the plates being grounded for radio frequencies through capacitors 53 and 54, and the output being taken from the cathodes. The signal is applied to both the screen and control grids of tubes 46 and 47 from suitable taps on coil 42.

The tubes are operated with a suitable bias obtained from diode rectifier 50 and the filter network comprising resistor 43 and capacitors 44 and 45. One terminal of the filter network is connected to the cathodes of the two tubes and the other terminal of the filter network is connected to both the plate of diode 50 and the center tap of coil 42. The cathode of the tubes are connected to ground through load resistor 55. Capacity inherent in the circuit components serves to filter the carrier frequency and its harmonics from the output. It is apparent that the carrier frequency must be substantially higher than any of the significant components of the modulating signal.

Since the positive pulse output is taken from the cathodes of the rectifier tubes, it is necessary that filament heater circuits and the bias generating circuits be operated with reference to the potential of these cathodes. Accordingly, a low capacitance transformer 51 is provided to supply these circuits.

The negative control pulses are also applied from terminal 10 through the coupling circuit comprising capacitor 65 and resistor 66 to the control grid of the second pulse amplier tube 16. The output of noise generator 18 is applied to the control grid of noise amplifier tube 60 from the movable tap on potentiometer 70. The position of the movable tap on potentiometer 70 determines the amplitude of the noise signal applied. In the plate circuit of noise amplifier 60 are resistors 61 and 63 and inductances 62 and 64 arranged in a manner known to the art to provide desirable peaking of the noise signal. The plate of pulse amplifier tube 16 is connected through isolating resistor 68 to the plate circuit of noise amplifier tube 60 in such a way that the amplified signals from both tubes are mixed on the common plate inpedance comprising resistor 61 and inductance 62. The mixed signal, which consists of noise modulated positive pulses, is applied to the control grids of the noise modulator tubes 77 and 78.

The noise modulator tubes 77 and 78 are operated in parallel for greater power output. A negative bias is applied to the control grids of these tubes from the tap on potentiometer 75 through resistor 76. The position of the tap on potentiometer 75 is adjusted so that these tubes will be cut off in the no signal condition. The plate load impedance of the two tubes comprises resistors 79 and 81 and inductances 80 and 82 arranged according to methods known to the art so as to effect peaking of the noise signal. The output of the noise modulator tubes is applied through capacitor 83 to the center tap of coil 34 from which terminal it effects grid modulation of carrier amplifier tubes 35 and 36.

It is apparent that, since the noise modulator tubes 77 and 78 receive a pulsed enabling signal as well as the noise signal, the output of these tubes comprises negative noise modulated pulses. The negative pulse component of this signal increases the negative bias on carrier amplifier tubes 35 and 36 during their operative periods and makes possible efficient class C amplification.

Although we have shown and described only a certain and specific embodiment of the invention, we are fully aware of the many modifications possible thereof. Therefore, this invention is not to be limited except insofar as is necessitated by the spirit and the scope of the claims.

In the appended claims the word "noise" is intended to pertain to an electrical signal comprising the random combination of a broad spectrum of frequencies.

The invention described herein may be manufactured and used by or for the Government of the United States of America for governmental purposes without the payment of any royalties thereon or therefor.

What is claimed is:

1. A method of generating high voltage electrical impulses responsively to control signal pulses which comprises, developing oscillations coincident with the start of each control signal pulse, maintaining oscillations during each control signal pulse, attenuating oscillations at the end of each control signal pulse, and rectifying said oscillations to form a high voltage impulse.

2. A method of generating high voltage electrical impulses responsively to and coincident with control signal pulses which comprises, generating oscillations at a low amplitude level, increasing said oscillations to peak amplitude responsively to and coincident with the start of each control signal pulse, maintaining said oscillations at peak amplitude during each control signal pulse, restoring said oscillations to the low amplitude level at the end of each control signal pulse, and rectifying the peak amplitude oscillations only to form a high voltage impulse.

3. A method of generating high voltage electrical impulses responsively to control signal pulses which comprises, developing oscillations coincident with the start of each control signal pulse, maintaining oscillations during each control signal pulse, attenuating oscillations at the end of each control signal pulse, amplifying said oscillations, and rectifying said amplified oscillations to form a high voltage impulse.

4. A method of generating high voltage electrical impulses responsively to and coincident with control signal pulses which comprises, generating oscillations at a low amplitude level, increasing said oscillations to peak amplitude responsively to and coincident wth the start of each control signal pulse, maintaining said oscillatons at peak amplitude during each control signal pulse, restoring said oscillations to the low amplitude level at the end of each control signal pulse, amplifying only the peak amplitude oscillations, and rectifying the amplified oscillations to form a high voltage impulse.

5. A method of generating high voltage modulated electrical impulses responsively to control signal pulses which comprises, developing oscillations coincident with the start of each control signal pulse, maintaining oscillations during each control signal pulse, attenuating oscillations at the end of each control signal pulse, modulating said oscillations, amplifying said modulated oscillations, and rectifying said amplified oscillations to form a modulated high voltage impulse.

6. A method of generating high voltage positive electrical impulses, said impulses being coincident with control signal pulses and being modulated with a noise signal, which comprises the steps of generating high frequency oscillations at a low amplitude lever between the control signal pulses, increasing these oscillations to peak amplitude responsively to and during each control signal pulse, generating a noise signal continuously, amplifying said noise signal only during the control signal pulses, mixing said amplified noise signal and said peak amplitude oscillations to form a composite signal, amplifying said composite signal, rectifying the amplified composite signal, and filtering the rectified signal to form a noise modulated high voltage impulse.

7. Apparatus for generating high voltage electrical impulses responsively to control signal pulses which comprises, an oscillator having a normally negligible output, means developing said output oscillations responsive to each control signal pulse, means amplifying the oscillations from said oscillator, and means rectifying the amplified oscillations to form a high voltage impulse.

8. Apparatus for generating modulated high voltage electrical impulses responsively to control signal pulses which comprises, an oscillator having a normally negligible output, means developing said output oscillations responsive to each control signal pulse, means amplifying the oscillations from said oscillator, means modulating said amplifier means, and means rectifying the amplified oscillations to form a modulated high voltage impulse.

9. Apparatus for generating high voltage electrical impulses responsively to and coincident with control signal pulses which comprises, a high frequency oscillator generating low amplitude oscillations between control signal pulses, means increasing the oscillations to peak amplitude during each control signal pulse, amplifier means responsive to the peak amplitude oscillations only, and means rectifying the amplified oscillations to form a high voltage impulse.

10. Apparatus for generating high voltage electrical impulses responsively to and coincident with control signal pulses which comprises, a high frequncy oscillator maintained in continuous operation; grid biasing means increasing the amplitude of the output oscillations of said oscillator responsively to each control signal pulse; amplifier means receiving the output of the oscillator, said amplifier means being responsive to the increased amplitude oscillations only, and means rectifying the amplified oscillations to form a high voltage impulse.

11. Apparatus for generating positive high voltage electrical impulses responsively to control signal pulses which comprises; an oscillator; means normally biasing said oscillator for negligible output; said biasing means rendered inoperative responsive to each control signal pulse; means amplifying the oscillations from said oscillator; a cathode loaded vacuum tube biased so as to be normally nonconducting; transformer means coupling said amplifier means and said vacuum tube, the input to said tube being applied between grid and cathode of said tube; and means filtering the output from the cathode of said tube to form a high voltage impulse.

12. Apparatus for generating positive high voltage electrical impulses responsively to and coincident with control signal pulses which comprises; an oscillator maintained in continuous operation; grid biasing means increasing the amplitude of the output oscillations of said oscillator responsively to each control signal pulse; amplifier means receiving the output of the oscillator, said amplifier means being responsive to the increased amplitude oscillations only; a cathode loaded vacuum tube biased so as to be normally nonconducting; transformer means coupling said amplifier means and said vacuum tube, the input to said tube being applied between grid and cathode of said tube; and means filtering the output from the cathode of said tube to form a high voltage impulse.

13. Apparatus for generating positive noise modulated high voltage electrical impulses responsively to and coincident with control signal pulses which comprises; an oscillator maintained in continuous operation; grid biasing means increasing the amplitude of the output oscillations of said oscillator responsively to each control signal pulse; a first amplifier means receiving the output of the oscillator, said amplifier means being responsive to the increased amplitude oscillations only; a source of noise signal; means amplifying said noise signal, said noise amplifying means being rendered operative only during said control signal pulses; means grid modulating said first amplifier means with the output from said second amplifier means; a cathode loaded vacuum tube biased so as to be normally nonconducting, transformer means coupling said first amplifier means and said vacuum tube, the input to said tube being applied between grid and cathode of said tube; and means filtering the output from the cathode of said tube to form a high voltage noise modulated impulse.

14. Apparatus for generating positive noise modulated high voltage electrical impulses responsively to and coincident with control signal pulses which comprises, an oscillator maintained in continuous operation; grid biasing means increasing the amplitude of the output oscillations of said oscillator responsively to each control signal pulse; a first amplifier means receiving the output of the oscillator, said amplifier means being responsive to the increased amplitude oscillations only; a source of noise signal; a source of pulsed enabling voltage operative responsively to said control signal pulses; a second amplifier means receiving said noise signal and biased to be operative by said enabling voltage only during said control signal pulses, the output of said second amplifier means comprising negative noise modulated pulses; means grid modulating said first amplifier means with the output from said second amplifier means, the negative pulse component of the output from said second amplifier means contributing to suitable bias for said first amplifier means; a cathode loaded vacuum tube biased so as to be normally nonconducting; transformer means coupling said first amplifier means and said vacuum tube, the input to said tube being applied between grid and cathode of said tube; and means filtering the output from the cathode of said tube to form a high voltage noise modulated impulse.

ANDREW V. HAEFF.
FRANKLIN H. HARRIS.

REFERENCES CITED

The following references are of record in the file of this patent:

UNITED STATES PATENTS

| Number | Name | Date |
|---|---|---|
| 1,872,398 | Brown | Aug. 16, 1932 |
| 2,113,214 | Luck | Apr. 5, 1938 |
| 2,398,097 | Kent | Apr. 9, 1946 |